(12) United States Patent
Fang et al.

(10) Patent No.: US 11,572,452 B2
(45) Date of Patent: *Feb. 7, 2023

(54) METHOD FOR RECYCLING CONTINUOUS ALCOHOLYSIS OF WASTE POLYESTER MATERIAL

(71) Applicant: AVANTGARDE (SHANGHAI) ENVIRONMENTAL TECHNOLOGY CO., LTD., Shanghai (CN)

(72) Inventors: Huayu Fang, Shanghai (CN); Enbin Zhu, Shanghai (CN); Dubin Wang, Shanghai (CN); Guoqing Yu, Shanghai (CN); Jincheng Chen, Shanghai (CN); Tianyuan Li, Shanghai (CN); Jiantong Wu, Shanghai (CN); Jianhua Chen, Shanghai (CN); Shengyao Lin, Shanghai (CN)

( * ) Notice: Subject to any disclaimer, the term of this patent is extended or adjusted under 35 U.S.C. 154(b) by 250 days.

This patent is subject to a terminal disclaimer.

(21) Appl. No.: 17/013,669

(22) Filed: Sep. 7, 2020

(65) Prior Publication Data

US 2021/0040287 A1 Feb. 11, 2021

Related U.S. Application Data

(63) Continuation-in-part of application No. PCT/CN2020/076451, filed on Feb. 24, 2020.

(30) Foreign Application Priority Data

Jul. 10, 2019 (CN) .......................... 201910617806.8

(51) Int. Cl.
*C08J 11/16* (2006.01)
*C08J 11/02* (2006.01)
*C08J 11/24* (2006.01)

(52) U.S. Cl.
CPC ............... *C08J 11/02* (2013.01); *C08J 11/24* (2013.01); *C08J 2367/00* (2013.01)

(58) Field of Classification Search
CPC ........ C08J 11/02; C08J 11/24; C08J 2367/00; C08J 11/16
USPC .......... 521/48; 528/190, 193, 194, 271, 272, 528/274
See application file for complete search history.

(56) References Cited

U.S. PATENT DOCUMENTS

| 6,472,557 B1 * | 10/2002 | Pell, Jr. ................... C07C 67/03 560/96 |
| 2021/0024717 A1 * | 1/2021 | Fang ......................... C08J 11/24 |
| 2021/0024718 A1 * | 1/2021 | Fang ......................... C08J 11/22 |

* cited by examiner

*Primary Examiner* — Terressa Boykin

(57) ABSTRACT

The present invention is in related to a method for recycling a waste polyester material, more particularly to a method for recycling the waste polyester material through a chemical way to produce DMT. It belongs to the technical field of recycling and utilization of waste polyester materials. The present invention adopts the technology of continuous feeding and continuous alcoholysis, so that the material undergoes homogeneous alcoholysis in a melting state, and the required alcoholysis time is short. Two or more alcoholysis tanks are used in series for continuous alcoholysis. The product quality is stable. At the same time, due to the optimization of the amount of EG in the alcoholysis process, distillation and concentration are not required after the alcoholysis step is completed. The alcoholysis product is directly entered into the transesterification tank for the transesterification reaction, and pure DMT products can then be generated.

16 Claims, 1 Drawing Sheet

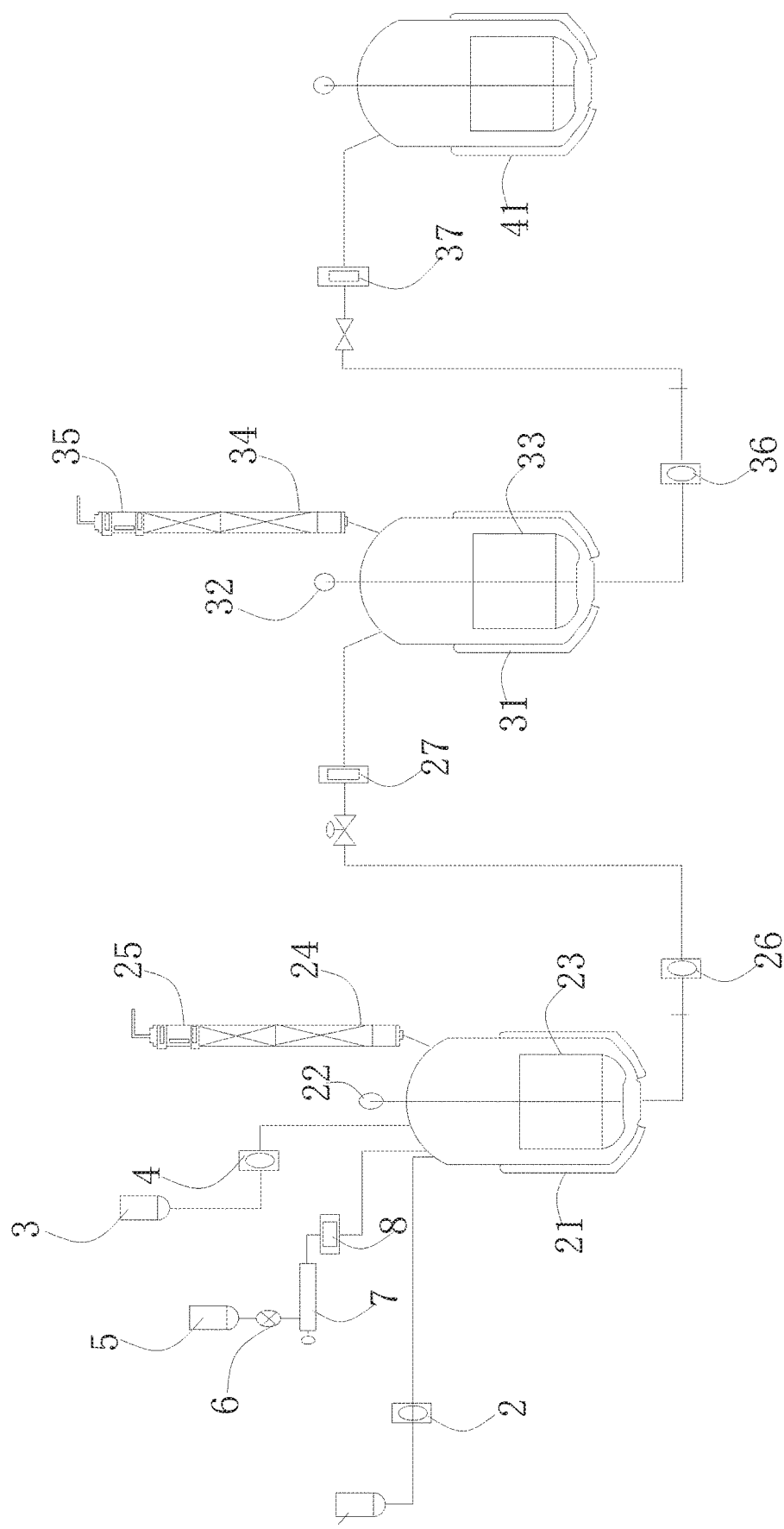

METHOD FOR RECYCLING CONTINUOUS ALCOHOLYSIS OF WASTE POLYESTER MATERIAL

BACKGROUND OF THE INVENTION

1. Field of the Invention

The present invention is in related to a method for recycling a waste polyester material, more particularly to a method for recycling the waste polyester material through a chemical way to produce DMT. It belongs to the technical field of recycling and utilization of waste polyester materials.

2. Description of the Prior Art

Polyester (polyethylene terephthalate, PET) is the most produced synthetic fiber material, widely used in fiber, textile fabrics, clothing, polyester bottles, films, sheets, etc. Based on the needs of enhanced environmental awareness, resource conservation and sustainability, how to deal with the scraps produced in the manufacture of polyester products and the waste generated from the use of polyester products has become an urgent problem to be solved, and the recycling of waste polyester has become a development direction of green textile.

At present, the recycling methods of waste polyester mainly include physical recycling and chemical recycling. The physical recycling methods are relatively simple and economic, but the performance of the recycled products is poor. An important direction of the chemical recycling method is the alcoholysis of waste polyester with ethylene glycol (EG) into bishydroxy terephthalate (BHET) or oligomers, and then through transesterification in methanol to produce Dimethyl Terephthalate (DMT) and ethylene glycol. Pure DMT is obtained through purification and used as a raw material for polyester production, while methanol and ethylene glycol are used in the reaction system through purification and recycling to achieve the recycling of waste polyester.

The U.S. Pat. No. 6,706,843B1 provides a method for recycling waste polyester to produce DMT. The patent uses EG with a weight of 0.5-20 times of the weight of the waste polyester and alcoholizes the waste polyester in the presence of a catalyst and at a temperature of 175° C.-190° C. Then, the alcoholysis product is distilled and concentrated to distill out EG, and the weight ratio of EG to waste polyester in the concentrated alcoholysis product is controlled in 0.5-2. The concentrated alcoholysis product is then transesterified with methanol to form DMT and purified by rectification to produce pure DMT. This technology uses solid polyester and EG alcoholysis reaction. The alcoholysis reaction is a solid-liquid heterogeneous reaction with long reaction time. At the same time, in the alcoholysis process of waste polyester, the amount of EG used for alcoholysis is large. In order to carry out the transesterification reaction well, it is necessary to distill out part of the EG in the alcoholysis product, which has a process of concentrating the alcoholysis product, leading to an increase in concentration devices and energy consumption.

Therefore, it is necessary to provide a method for continuously recycling waste polyester material to solve the problems of long reaction time and many impurities of products of the solid-liquid heterogeneous reaction and a lot more equipped concentration devices, so as to cause the problems of more energy consumption, high maintenance cost, etc.

SUMMARY OF THE INVENTION

In order to achieve above objectives, a method for recycling continuous alcoholysis of a waste polyester material is provided and has the following steps of:

material pretreatment: dewatering and deoxidizing the waste polyester material to obtain a raw waste polyester material;

alcoholysis: the raw waste polyester material, an alcoholysis agent and an alcoholysis catalyst in melting state being continuously and simultaneously fed into a first alcoholysis tank for a first alcoholysis in order to obtain a first melt, wherein the first melt is continuously fed to a second alcoholysis tank for a second alcoholysis, so as to obtain an alcoholysis product; and transesterification: the alcoholysis product, a transesterification agent, a transesterification catalyst in melting state being fed into a transesterification tank for a transesterification reaction in order to obtain crude DMT and crystallization, separation and purification of the crude DMT, wherein the first alcoholysis tank and the second alcoholysis tank are connected to each other in series.

Compared with the prior art, the present invention has at least the following beneficial effects:

The recycling method disclosed by the present invention adopts the technologies of continuous feeding and continuous alcoholysis in order to make the material undergo homogeneous alcoholysis in melting state. The time for alcoholysis is short, and two alcoholysis tanks connected to each other in series for continuous alcoholysis manufactures stable products. More, the amount of EG in alcoholysis process is optimized without any further distillation and concentration. Hence, the alcoholysis product directly enters a transesterification tank for transesterification reaction in order to save concentration devices.

The technical content, structural features, achieved objectives and effects of the technical solution of the present disclosure will be described in detail below.

The method for recycling the continuous alcoholysis of a waste polyester material comprises the steps of:

material pretreatment: dewatering and deoxidizing the waste polyester material to obtain a raw waste polyester material;

alcoholysis: the raw waste polyester material, an alcoholysis agent and an alcoholysis catalyst in a melting state being continuously and simultaneously fed into a first alcoholysis tank for a first alcoholysis in order to obtain a first melt, wherein the first melt is continuously fed to a second alcoholysis tank for a second alcoholysis, so as to obtain an alcoholysis product; and transesterification: the alcoholysis product, a transesterification agent, a transesterification catalyst in melting state being fed into a transesterification tank for a transesterification reaction in order to obtain crude DMT and crystallization, separation and purification of the crude DMT, wherein the first alcoholysis tank and the second alcoholysis tank are connected to each other in series.

After wide research, without proceeding dewatering and deoxidizing to the waste polyester material, the water content and the surface oxygen may greatly affect to the following alcoholysis reaction and the product. Otherwise, the waste polyester material being regularly dewatered and deoxidized makes a reduction of 2% to 300 ppm of the water content in order to obtain a raw waste polyester material. Therefore, under the condition of a screw being melted, a possibility to a sub-reaction is greatly lowered down, so as to assure the purity and reaction efficiency.

The raw waste polyester material, an alcoholysis agent and an alcoholysis catalyst in a melting state are continuously and simultaneously fed into a first alcoholysis tank for a first alcoholysis. For instance, using the screw to heat the raw waste polyester material for being in a melting state. Hence, the screw may be melted and fed simultaneously through a rotary propulsion method. The rotary speed of the screw adjusts a delivery amount of the melted raw waste polyester material. The rotary speed of the screw is controlled by a liquid level in the first alcoholysis tank for achieving a relative stability of the liquid level in the first alcoholysis tank. An alcoholysis agent and an alcoholysis catalyst in a liquid state are continuously and simultaneously fed into the first alcoholysis tank through a fixed amount controlled by a metering pump in order to obtain a melt A after the first alcoholysis. The melt A is then fed into a second alcoholysis tank that is connected to the first alcoholysis tank in series for a second alcoholysis. Namely, the rotary speed of a pump controls a delivery amount of the melt A, and the rotary speed of the pump is decided by a liquid level in the second alcoholysis tank for achieving a relative stability of the liquid level in the second alcoholysis tank. The present invention takes the advantages of the alcoholysis reaction being carried out more thoroughly and the consistency of the alcoholysis degree being guaranteed, so as to obtain DMT, which recovery and purity are raised, after transesterification.

Further, the form of the raw waste polyester material has a certain influence on the effect of recycling alcoholysis. Before the raw waste polyester material fed into a alcoholysis tank, the melting state becomes a liquid state from a solid state. Through a filter process, impurities are disappeared, so as to raise the recovery and reaction rate of the alcoholysis. That is, it will save the energy of reaction and the cost of equipment. More particularly, after the first alcoholysis, the molar quality and viscosity of the melt A fed into the second alcoholysis tank are relatively low. Hence, the filter accuracy of a filter program, before the melt A fed into the second alcoholysis tank, is more precise than the filter accuracy of a filter program, before the melt A fed into the first alcoholysis tank.

Preferably, a step, proceeding a filter process to the raw waste polyester material, is before the step of alcoholysis.

Further, the weight ratio of the waste polyester raw material and the alcoholysis agent has a certain influence on the depolymerization reaction. If the amount of alcoholysis agent is too high, it may cause excessive alcoholysis to be mixed into the alcoholysis product, and other sub-products will be formed in the alcoholysis. Too little alcoholysis agent dosage may cause incomplete alcoholysis, and the alcoholysis product contains more long-chain waste polyester, both of these situations will affect the product quality stability of the alcoholysis product, then affecting the subsequent transesterification reaction.

Preferably, the weight ratio of the raw waste polyester material to the alcoholysis agent is 1.0:1.0~2.0, the raw waste polyester material and the alcoholysis agent are continuously and simultaneously fed into the first alcoholysis tank.

The amount of the alcoholysis catalyst in the alcoholysis reaction is an important factor to the alcoholysis product. Only a suitable range of the amount of the alcoholysis catalyst may assure the efficiency of the alcoholysis, but without wasting it.

Preferably, an adding amount of the alcoholysis catalyst is 0.3 w %~3.0 wt % according to a weight of the waste polyester material as a standard.

A further study has found that, after the alcoholysis agent and the alcoholysis catalyst are fed into the first alcoholysis tank continuously and simultaneously in a liquid state, a mix of the alcoholysis agent and the alcoholysis catalyst in a quantitative relationship in a liquid state is with the best —COOH and —OH ratio, and then combined with the raw waste polyester materials in a quantitative range, wherein the raw waste polyester material has been removed from infusible impurities. Therefore, it can be ensured that the alcoholysis product with a desired degree is irreversibly obtained.

Preferably, the alcoholysis catalyst is dissolved in the alcoholysis agent in order to obtain alcoholysis catalyst liquid. The alcoholysis catalyst liquid and the raw waste alcoholysis material are continuously and simultaneously fed into the first alcoholysis tank. An adding amount of the alcoholysis catalyst is 10 wt %~70 wt % according to a weight of the alcoholysis agent as a standard.

The reaction temperature and reaction time in the alcoholysis tank may be two important factors in the quality stability of the product. The temperature of the alcoholysis tank is achieved by adding a heat source medium to the heating sheath outside the alcoholysis tank and the tube of the internal heating plate, and controlling the amount of the heat source medium. It is to be noted that, too low alcoholysis temperature will not be proper to the progress of the alcoholysis reaction, otherwise, too high temperature will cause side reactions.

Preferably, the temperature range of the alcoholysis in the first alcoholysis tank is 180° C.~200° C., and the time range of the alcoholysis is 40 min~90 min.

Preferably, the temperature range of the alcoholysis in the second alcoholysis tank is 180° C.~200° C., and the time range of the alcoholysis is 40 min~90 min.

Further, the different categories of the alcoholysis catalysis are also important factors to the alcoholysis reaction. According to massive researches, potassium carbonate and zinc acetate are the preferred alcoholysis catalysts for polyester alcoholysis.

The inventor has further discovered through a lot of research that the form of the waste polyester material has a greater impact on the process of feeding through the heating of the screw. Therefore, the waste polyester material to be depolymerized is processed through densification technology to depolymerize the waste polyester material. The waste polyester material is processed into 5-10 mm×5-10 mm uniform granular material, which will make the material easy to transport. The densification technology can use conventional technologies, such as semi-melt friction densification, melt granulation densification, etc., to pretreat waste polyester materials. This means that one or a mixture of two or more of waste polyester bottle flakes, polyester films, polyester fibers, and waste textiles can be used as raw materials, and uniform particles processed by densification technology can be used as raw materials, or they can be directly purchased after processing Uniform pellets of waste polyester materials as raw materials.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein:

The drawing illustrates a schematic diagram of a method for recycling continuous alcoholysis of a waste polyester material of the present invention.

DETAILED DESCRIPTION OF THE INVENTION

In order to describe in detail the technical content, structural features, achieved objectives and effects of the instant application, the following detailed descriptions are given in conjunction with the drawings and specific embodiments. It should be understood that these embodiments are only used to illustrate the application and not to limit the scope of the instant application.

With reference to the drawing, which illustrates a schematic diagram of a method for recycling continuous alcoholysis of a waste polyester material.

The raw material is uniform waste polyester particles with an average particle size ≤10 mm. The moisture content is ≤0.5%. The waste polyester particles are fed into a screw extruder 7 from a high-level storehouse 5 through a rotary feeder 6 for melting, and are filtered by a filter program 8 to remove infusible impurities, and continuously entered into a first alcoholysis tank 21 in a melting state. The melting temperature of the screw extruder 7 is 275° C., and the filter accuracy of the screening program 8 is 150 μm.

The molten material is continuously fed into the first alcoholysis tank 21 at a speed of 1000 kg/h, and the conveying amount of the molten material is adjusted by the rotational speed of the screw extruder 7. The rotary speed is controlled by the liquid level of the first alcoholysis tank 21 to achieve a relatively stable liquid level of the first alcoholysis tank 21, wherein the liquid level element-rotary speed value can be set by a central control system.

The EG in an EG storage tank 1 and the alcoholysis catalyst in an alcoholysis catalyst storage tank 3 are transported into the first alcoholysis tank 21 through a metering pump 2 and a metering pump 4 respectively. The rotary speed of the metering pumps 2 and 4 and the rotary speed of a waste polyester screw 9 will be adjusted using a fixed ratio. The feed rate of the EG is 1500 kg/h. In the mixed solution of the alcoholysis catalyst (potassium carbonate) and the alcoholysis agent (ethylene glycol), the potassium carbonate concentration is 25%, and the potassium carbonate solution is fed in the speed of 80 kg/h.

The first alcoholysis tank 21 contains 2000 kg of alcoholysis materials of the same composition. The waste polyester material is continuously fed into the first alcoholysis tank 21 in a melting state, and then stirred by a stirrer 23, and mixed with the original materials, the newly introduced EG, and the newly introduced alcoholysis catalyst evenly, so that the homogeneous alcoholysis. The alcoholysis temperature is 190° C., and the material residence time (alcoholysis time) is 60 min.

The material in the first alcoholysis tank 21 is filtered by a delivery pump 26 and a filter program 27 and then is continuously fed into a second alcoholysis tank 31 to continue alcoholysis. The rotary speed of the delivery pump 26 is controlled by the liquid level of the second alcoholysis tank 31 to ensure that the liquid level in the second alcoholysis tank 31 is relatively stable. The filter accuracy of the filter program 27 is 80 μm. The temperature in the second alcoholysis tank 31 is 195° C., and the alcoholysis time is 50 minutes. After sampling and analysis, the content of one of the monomers of the alcoholysis product BHET is 75%, and the total content of the monomers, dimers, trimers and tetramers is 97%.

The alcoholysis product in the second alcoholysis tank 31 is continuously and quantitatively added to a transesterification tank 41. Methanol, transesterification catalyst and alcoholysis product are put into the transesterification tank 41 in a fixed ratio. The alcoholysis material and methanol are transesterified in the presence of a catalyst to generate crude DMT. The weight ratio of methanol to the alcoholysis product can be converted into the initial waste polyester material:methanol=1:2. For the transesterification reaction carried out in the presence of the catalyst, the reaction temperature is 75° C. and the reaction time is 70 min.

The alcoholysis catalyst is potassium carbonate. The amount of potassium carbonate is 2.0% of the amount of the waste polyester material. Potassium carbonate is added in the form of EG solution. The catalyst concentration in the EG solution is 25%.

The above-mentioned transesterification product enters into a DMT crystallizer, and the temperature is lowered to below 40° C., and the DMT crystal will be precipitated. Filter to obtain crude DMT cake and filtrate. The crude DMT cake can be washed with methanol multiple times to obtain a DMT cake. The DMT cake is purified by a short-flow distillation system under the conditions of 6.65 Kpa vacuum and 200° C. to obtain pure DMT. The purity of DMT recovered by above recovery method is 99.5%, and the recovery rate is 92%.

Embodiment 2

The waste polyester was recycled by the same continuous alcoholysis method as in Embodiment 1, except that the transesterification catalyst was a methanol solution of potassium carbonate, and the potassium carbonate concentration was 25%. The purity of DMT obtained by this method is 99.5%, and the recovery rate is 92%.

Embodiment 3

The waste polyester was recycled by the same continuous alcoholysis method as in Example 1, except that the raw material was waste polyester film, which was processed into fragments of 5-10 mm×5-10 mm. The purity of DMT obtained by this method is 99.5%, and the yield is 92.5%.

Comparative Embodiment 1

The raw material is waste polyester pellets, the average particle size is less than or equal to 10 mm, and the moisture content is less than or equal to 0.5%.

The difference from Embodiments 1-3 is that the way for the materials required for the alcoholysis reaction to enter the alcoholysis tank is the mode of intermittent feeding. In the first alcoholysis tank 21 containing 2000 kg of alcoholysis materials of the same composition, 1500 kg of EG, 80 kg of 25% potassium carbonate solution are put into the first alcoholysis tank 21, and 1000 kg of waste polyester pellets are put under stirring and gradually heated to 190° C. for alcoholysis reaction, the reaction time at 190° C. 60 min. Sampling and analysis of the alcoholysis product BHET monomer content is 57%, the total content of the monomer, dimer, trimer and tetramer is 74%.

After being filtered by the filter program 27 in the first alcoholysis tank 21, it will enter the transesterification tank 41 at one time, and the remaining 2000 kg in the first alcoholysis tank 21 is used for the next alcoholysis. The filtering accuracy of the filter program 27 is 80 μm. In the transesterification tank 41, 2000 kg of methanol and a transesterification catalyst are added, and the transesterification reaction is carried out in the presence of the catalyst. The reaction temperature is 75° C. and the reaction time is 70 minutes. The catalyst is potassium carbonate. The amount of potassium carbonate is 2.0% of the waste polyester. Potassium carbonate is added in the form of an EG solution. The catalyst concentration in the EG solution is 25%.

The above-mentioned transesterification product enters the DMT crystallizer, and the temperature of the material is lowered to below 40° C., and the DMT crystals will be precipitated. After filtration, a crude DMT cake and filtrate are obtained. The crude DMT cake can be washed with methanol multiple times to obtain the DMT cake. The DMT cake undergoes the purification procedure through the short-flow rectification system under the conditions of a vacuum of 6.65 Kpa and a temperature of 200° C. to obtain pure the DMT. The purity of the obtained DMT is 99.4%, and the recovery rate is 82%.

Comparative Embodiment 2

The raw material is waste polyester particles with an average particle size smaller or equal to 10 mm. The moisture content is smaller or equal to 0.5%. Comparative Example 2 is similar to Comparative Example 1, and both adopt intermittent feeding method for alcoholysis reaction.

Put 2500 kg of EG, 80 kg 25% potassium carbonate solution into the first alcoholysis tank 21 containing 2000 kg of alcoholysis materials of the same composition, put 1000 kg of polyester pellets under stirring, and gradually raise the temperature to 190° C. for alcoholysis. For the reaction, the reaction time at 190° C. is 120 min. Sampling and analysis of the alcoholysis product monomer BHET content is 74%, the total content of the monomer, dimer, trimer and tetramer is 89%.

After the material in the first alcoholysis tank 21 is filtered by the filter program 27, it enters the transesterification tank 41 at one time, and the remaining 2000 kg in the first alcoholysis tank 21 is used for the next alcoholysis. The filter accuracy of the filter program 27 is 80 μm. In the transesterification tank 41, 2000 kg of methanol and a transesterification catalyst are added, and the transesterification reaction is carried out in the presence of the catalyst. The reaction temperature is 75° C. and the reaction time is 70 min. The catalyst is potassium carbonate. The amount of potassium carbonate is 2.0% of the waste polyester. Potassium carbonate is added in the form of an EG solution. The catalyst concentration in the EG solution is 25%.

The above-mentioned transesterification product enters the DMT crystallizer, and the temperature of the material is lowered to below 40° C., and the DMT crystals will be precipitated. After filtration, a crude DMT cake and filtrate will be obtained. The crude DMT cake can be washed multiple times with methanol to obtain the DMT cake. The DMT cake undergoes the purification procedure through the short-flow rectification system under the conditions of a vacuum of 6.65 Kpa and a temperature of 200° C. to obtain pure DMT. The purity of the pure DMT obtained was 99.4%, and the recovery rate was 78%.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A method for recycling continuous alcoholysis of a waste polyester material comprising:
    (a) material pretreatment: dewatering and deoxidizing the waste polyester material to make a reduction to below 300 ppm of the water content to obtain a raw waste polyester material;
    (b) alcoholysis: after the step (a), the raw waste polyester material, an alcoholysis agent and an alcoholysis catalyst in a melting state being continuously and simultaneously fed into a first alcoholysis tank for a first alcoholysis in order to obtain a first melt, wherein the first melt is continuously fed to a second alcoholysis tank for a second alcoholysis, so as to obtain an alcoholysis product; and
    (c) transesterification: the alcoholysis product, a transesterification agent, a transesterification catalyst in melting state being fed into a transesterification tank for a transesterification reaction in order to obtain crude dimethyl terephthalate(DMT) and crystallization, separation and purification of the crude DMT, wherein the first alcoholysis tank and the second alcoholysis tank are connected to each other in series.

2. The method for recycling the continuous alcoholysis of the waste polyester material according to claim 1, wherein a step (a1) between the step (a) and the step (b) is that of: proceeding a filter process to the raw waste polyester material.

3. The method for recycling the continuous alcoholysis of the waste polyester material according to claim 1, wherein the alcoholysis agent is ethylene glycol, the weight ratio of the raw waste polyester material to the alcoholysis agent being 1.0:1.0~2.0, the raw waste polyester material and the alcoholysis agent being continuously and simultaneously fed into the first alcoholysis tank.

4. The method for recycling the continuous alcoholysis of the waste polyester material according to claim 1, wherein the alcoholysis catalyst is selected from the group consisting of: potassium carbonate and zinc acetate, an adding amount of the alcoholysis catalyst being 0.3 wt %~3.0 wt % according to a weight of the waste polyester material as a standard.

5. The method for recycling the continuous alcoholysis of the waste polyester material according to claim 3, wherein the alcoholysis catalyst is dissolved in the alcoholysis agent in order to obtain alcoholysis catalyst liquid, an adding amount of the alcoholysis catalyst being 10 wt %~70 wt % according to a weight of the alcoholysis agent as a standard.

6. The method for recycling the continuous alcoholysis of the waste polyester material according to claim 5, wherein reaction conditions of the first alcoholysis tank and the second alcoholysis tank are that of: an alcoholysis temperature range of 180° C.~200° C. and an alcoholysis time range of 40 min~90 min.

7. The method for recycling the continuous alcoholysis of the waste polyester material according to claim 1, wherein the transesterification agent is methanol, a weight ratio of the raw waste polyester material to the transesterification agent is 1.0:1.0~3.0.

8. The method for recycling the continuous alcoholysis of the waste polyester material according to claim 1, wherein the transesterification catalyst is selected from the group consisting of: sodium hydroxide and potassium carbonate, an adding amount of the transesterification catalyst being 0.2 wt %~5.0 wt % according to a weight of the waste polyester material as a standard.

9. The method for recycling the continuous alcoholysis of the waste polyester material according to claim 8, wherein the adding amount of the transesterification catalyst is 0.3 wt %~2.0 wt % according to the weight of the waste polyester material as a standard.

10. The method for recycling the continuous alcoholysis of the waste polyester material according to claim 7, wherein reaction conditions of the transesterification are that of: a reaction temperature range of 60° C.~80° C. and a reaction time range of 30 min~90 min.

11. The method for recycling the continuous alcoholysis of the waste polyester material according to claim 4, wherein the alcoholysis catalyst is dissolved in the alcoholysis agent in order to obtain alcoholysis catalyst liquid, an adding amount of the alcoholysis catalyst being 10 wt %~70 wt % according to a weight of the alcoholysis agent as a standard.

12. The method for recycling the continuous alcoholysis of the waste polyester material according to claim 11, wherein reaction conditions of the first alcoholysis tank and the second alcoholysis tank are that of: an alcoholysis temperature range of 180° C.~200° C. and an alcoholysis time range of 40 min~90 min.

13. The method for recycling the continuous alcoholysis of the waste polyester material according to claim 8, wherein reaction conditions of the transesterification are that of: a reaction temperature range of 60° C.~80° C. and a reaction time range of 30 min~90 min.

14. The method for recycling the continuous alcoholysis of the waste polyester material according to claim 1, wherein the raw waste polyester material is uniform waste polyester particles, and the waste polyester particles are fed into a screw extruder from a high-level storehouse through a rotary feeder for melting to form a molten material, and the waste polyester particles are filtered by a first filter program, and the conveying amount of the molten material is adjusted by the rotational speed of the screw extruder, and the rotary speed is controlled by the liquid level of the first alcoholysis tank.

15. The method for recycling the continuous alcoholysis of the waste polyester material according to claim 14, wherein the material in the first alcoholysis tank is filtered by a second filter program and then is continuously fed into the second alcoholysis tank, and the rotary speed of the delivery pump is controlled by the liquid level of the second alcoholysis tank.

16. The method for recycling the continuous alcoholysis of the waste polyester material according to claim 15, wherein the filter accuracy of the second filter program is more precise than the filter accuracy of the first filter program.

* * * * *